(12) United States Patent
Kim

(10) Patent No.: US 12,263,895 B2
(45) Date of Patent: Apr. 1, 2025

(54) STEER-BY-WIRE TYPE STEERING APPARATUS

(71) Applicant: HL MANDO CORPORATION, Pyeongtaek-si (KR)

(72) Inventor: Tae Sik Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 774 days.

(21) Appl. No.: 17/606,932

(22) PCT Filed: May 13, 2020

(86) PCT No.: PCT/KR2020/006253
§ 371 (c)(1),
(2) Date: Oct. 27, 2021

(87) PCT Pub. No.: WO2020/231160
PCT Pub. Date: Nov. 19, 2020

(65) Prior Publication Data
US 2022/0204073 A1 Jun. 30, 2022

(30) Foreign Application Priority Data
May 15, 2019 (KR) .......................... 10-2019-0056837

(51) Int. Cl.
*B62D 5/04* (2006.01)
*B62D 5/00* (2006.01)

(52) U.S. Cl.
CPC .......... *B62D 5/0454* (2013.01); *B62D 5/005* (2013.01); *B62D 5/0409* (2013.01)

(58) Field of Classification Search
CPC ..... B62D 5/0454; B62D 5/005; B62D 5/0409
See application file for complete search history.

(56) References Cited

U.S. PATENT DOCUMENTS 3,810,395 A * 5/1974 Takahashi ................ B62D 3/08
74/89.23
3,986,408 A * 10/1976 Takahashi ................ B62D 3/08
74/499
(Continued)

FOREIGN PATENT DOCUMENTS

CN 1935575 A 3/2007
CN 104214314 A 12/2014
(Continued)

OTHER PUBLICATIONS

International Search Report (PCT/ISA/210) issued in PCT Application No. PCT/KR2020/006253 dated Aug. 7, 2020 with English Translation.
(Continued)

*Primary Examiner* — Kevin Hurley
*Assistant Examiner* — Michael R Stabley
(74) *Attorney, Agent, or Firm* — Hauptman Ham, LLP

(57) ABSTRACT

The present embodiments relate to a steer-by-wire type steering apparatus, which prevents a steering shaft from mechanically rotating by means of a gear structure when a driver turns the steering wheel at the maximum rotation angle or greater, so as to enable efficient limiting of the steering wheel operation of the driver to be within a maximum rotation angle without increasing the size, the weight and the like of a motor for transmitting torque to the steering shaft and the like, and to be advantageous with respect to production costs, packaging and the like.

19 Claims, 13 Drawing Sheets

(56) References Cited

U.S. PATENT DOCUMENTS

| | | | | |
|---|---|---|---|---|
| 4,368,794 | A | * | 1/1983 | Elser ................ B62D 5/30 |
| | | | | 91/375 A |
| 5,289,891 | A | * | 3/1994 | Sugiyama ............ B62D 7/1581 |
| | | | | 475/5 |
| 7,654,167 | B2 | * | 2/2010 | Watanabe ............... F16H 55/22 |
| | | | | 74/425 |
| 8,433,477 | B2 | * | 4/2013 | Mukai ................. B62D 5/0484 |
| | | | | 701/41 |
| 8,650,969 | B2 | * | 2/2014 | Arimura ................. B62D 6/10 |
| | | | | 73/862.331 |
| 10,106,192 | B2 | | 10/2018 | Saal et al. |
| 2011/0120797 | A1 | | 5/2011 | Kitahata et al. |
| 2012/0035810 | A1 | | 2/2012 | Mukai et al. |
| 2012/0055730 | A1 | * | 3/2012 | Mukai ................... B62D 5/008 |
| | | | | 180/444 |
| 2018/0237062 | A1 | | 8/2018 | Saal et al. |

FOREIGN PATENT DOCUMENTS

| | | | |
|---|---|---|---|
| CN | 204548216 U | | 8/2015 |
| CN | 106275058 A | | 1/2017 |
| CN | 206202413 U | | 5/2017 |
| CN | 206634059 U | | 11/2017 |
| DE | 19743961 A1 | | 4/1999 |
| DE | 100 19 658 A1 | | 11/2000 |
| DE | 10 2010 056 068 A1 | | 6/2012 |
| EP | 2 993 110 A1 | | 3/2016 |
| JP | 2001-355700 A | | 12/2001 |
| JP | 2005-342303 A | | 12/2005 |
| JP | 2006-315658 A | | 11/2006 |
| JP | 2007-106139 A | | 4/2007 |
| JP | 2010-270908 A | | 12/2010 |
| JP | 2011-116214 A | | 6/2011 |
| JP | 2013-71605 A | | 4/2013 |
| JP | 2015-98900 A | | 5/2015 |
| WO | 2008/068912 A1 | | 6/2008 |

OTHER PUBLICATIONS

Korean language Written Opinion (PCT/ISA/237) issued in PCT Application No. PCT/KR2020/006253 dated Aug. 7, 2020.

Notice of Allowance issued on Apr. 21, 2024, in connection with the Chinese Patent Application No. 202080036228.X, with its English translation, 6 pages.

Office Action issued on Jan. 9, 2024, for corresponding Chinese Patent Application No. 202080036228.X, along with partial English translation (15 pages).

* cited by examiner

STEER-BY-WIRE TYPE STEERING APPARATUS

CROSS-REFERENCE OF RELATED APPLICATIONS

This application is the U.S. National Phase under 35 U.S.C. § 371 of International Patent Application No. PCT/KR2020/006253, filed on May 13, 2020, which claims the benefit of Korean Patent Application No. 10-2019-0056837, filed on May 15, 2019, the entire disclosures of each are incorporated by reference herein.

CROSS-REFERENCE TO RELATED APPLICATION

This application claims priority from Korean Patent Application No. 10-2019-0056837, filed on May 15, 2019, which is hereby incorporated by reference for all purposes as if fully set forth herein. In addition, if this patent application claims priority for countries other than the United States for the same reason as above, all the contents are incorporated into this patent application by reference.

TECHNICAL FIELD

The present disclosure relates to a vehicle steering apparatus, and more specifically, to a steer-by-wire type of steering apparatus that is capable of effectively limiting the turning of a steering wheel within a predetermined rotation angle even without boosting the size and weight etc. of a motor that generates torque to be transferred to a steering shaft by preventing the steering shaft from being rotated mechanically by a gear structure in a situation where the steering wheel is turned over the predetermined rotation angle, and has advantages in terms of cost, package, and the like.

BACKGROUND ART

A steer-by-wire type of steering apparatus (or referred to as a steer-by-wire steering system) is a type of electrical power assisted steering apparatus, and is an apparatus capable of steering a vehicle by using electrical power to steer a vehicle without a mechanical connection such as a steering column, a universal joint, and the like between a steering wheel and a front wheel steering apparatus.

That is, the turning of the steering wheel by a driver is converted into an electrical signal and transferred to an electronic control unit (ECU), and the torque of an associated motor can be determined based on the signal. In this case, since such a steer-by-wire steering system does not have a mechanical connection, it is possible to reduce damage to the driver caused by mechanical components, and reduce the number of hydraulic components and such mechanical connections. As a result of the reduction of the number of employed components, a vehicle weight can be reduced, and workload or process steps to be performed in a manufacturing assembly line can be reduced or simplified. In turn, fuel efficiency can be improved by reducing unnecessary energy consumption for steering the vehicle. Also, it is possible to achieve ideal steering performance by ECU programming.

However, since such a steer-by-wire type of steering system does not have a mechanical connection between the steering shaft and wheels, weight feel caused by friction, jamming and the like of the wheels on a road surface is not transferred to the driver, there is therefore a problem in that steering feel is deteriorated. In particular, it is desirable to provide an apparatus for preventing the steering wheel from being turned over a maximum rotation angle.

In a conventional steering system, a steering wheel has been designed not to be turned any more when the steering wheel reaches the maximum rotation angle by applying a torque in a direction opposite to a direction of turning the steering wheel by a driver using a motor for applying the torque to a steering shaft. In this case, since the motor capable of generating a high torque is required to offset steering torque provided by the driver, thus, there are disadvantages in terms of cost, weight, package, and the like.

DETAILED DESCRIPTION OF THE INVENTION

Technical Problem

To address these issues, embodiments of the present disclosure provide steer-by-wire type of steering apparatuses that are capable of effectively limiting the turning of a steering wheel within a predetermined rotation angle even without boosting the size and weight etc. of a motor that generates torque to be transferred to a steering shaft by preventing the steering shaft from being rotated mechanically by a gear structure in a situation where the steering wheel is turned over the predetermined rotation angle, and have advantages in terms of cost, package, and the like.

Technical Solution

According to aspects of the present disclosure, a steer-by-wire type of steering apparatus is provided that includes a worm wheel coupled to a steering shaft and including a gear, and a worm shaft that is axially slidable, and includes a worm gear including a first worm gear port ion rotatable in a situation of engaging the gear and a second worm gear portion not rotatable in a situation of engaging the gear.

According to aspects of the present disclosure, a steer-by-wire type of steering apparatus is provided that includes a worm shaft including a worm gear formed on the outer circumferential surface thereof, and a worm wheel that is coupled to a steering shaft and includes a gear including a first gear portion rotatable in a situation of engaging the worm gear and a second gear portion not rotatable in a situation of engaging the worm gear.

Effects of the Invention

According to embodiments of the present disclosure, it is possible to provide steer-by-wire type of steering apparatuses that are capable of effectively limiting the turning of a steering wheel within a predetermined rotation angle even without boosting the size and weight etc. of a motor that generates torque to be transferred to a steering shaft by preventing the steering shaft from being rotated mechanically by a gear structure in a situation where the steering wheel is turned over the predetermined rotation angle, and have advantages in terms of cost, package, and the like.

BEST MODE FOR CARRYING OUT THE INVENTION

Figure 1:
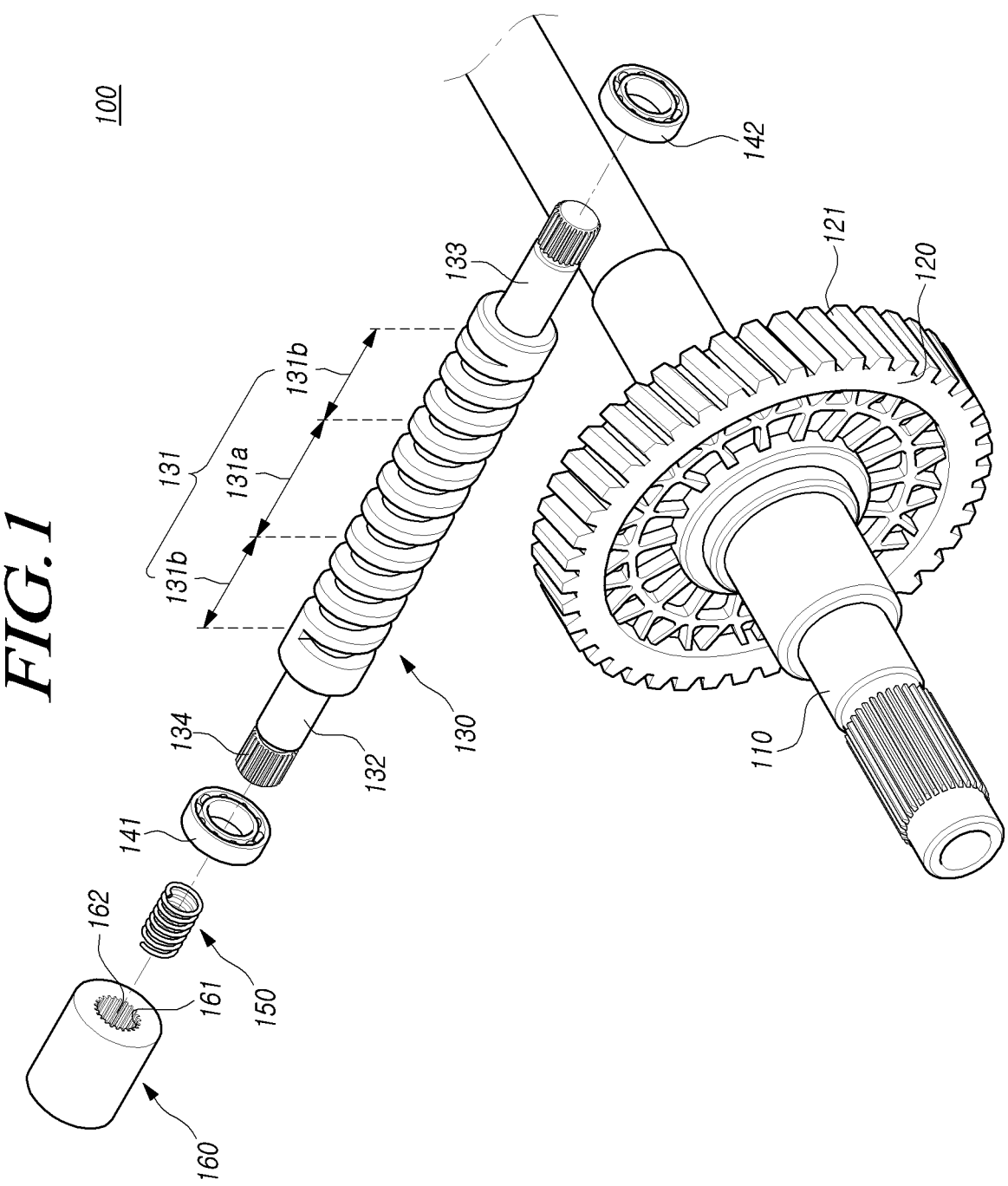
FIG. 1 is an exploded perspective view of a portion of a steer-by-wire type of steering apparatus according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steer-by-wire type of steering apparatus 100 according to aspects of the present disclosure is described with reference to FIGS. 1 to 7.

The steer-by-wire type of steering apparatus 100 according to aspects of the present disclosure includes a worm wheel 120 coupled to a steering shaft 110 and including a gear 121, and a worm shaft 130 that is axially slidable and includes a worm gear 131 including a first worm gear portion 131a rotatable in a situation of engaging the gear 121 and a second worm gear portion 131b not rotatable in a situation of engaging the gear 121.

The worm wheel 120 may be coupled to the steering shaft 110 connected with a steering wheel (not shown). The gear 121 may be formed on the outer circumferential surface of the worm wheel 120, and be engaged with the worm gear 131 of the worm shaft 130.

The worm gear 131 engaged with the gear 121 may be formed on the outer peripheral surface of the worm shaft 130. Shaft portions 132 and 133 of the worm shaft 130 may be disposed on both sides of the worm gear 131. The shaft portion 132 disposed on one side of the worm shaft 130 may be connected with a support member that is described below in further detail, and the shaft portion 133 disposed on the other side thereof may be connected with a motor (not shown) via a damping coupler (not shown).

That is, as the worm shaft 130 is rotated by the motor, resulting torque can be transferred to the steering shaft 110 through the worm shaft 130 and the worm wheel 120, and thereby the steering feel of a driver can be improved.

The worm shaft 130 may be disposed to be axially slidable. That is, when the worm wheel 120 coupled to the steering shaft 110 is rotated by the turning of the steering wheel, the worm shaft 130 can axially slide toward one side or the other side thereof based on the engagement of the gear 121 and the worm gear 131. That is, the worm shaft 130 can be rotated by the motor and the worm wheel 120 and slide in the axial direction.

The worm gear 131 of the worm shaft 130 may include the first worm gear portion 131a rotatable in a situation of engaging the gear 121, and the second worm gear portion 131b not rotatable in a situation of engaging the gear 121.

Before the steering wheel reaches a predetermined rotation angle, for example, a maximum rotation angle, the gear 121 engages the first worm gear portion 131a, and as a rotation angle of the steering wheel increases by the turning of a driver, the worm shaft 130 can axially slide. When the steering wheel reaches the maximum rotation angle, the gear 121 becomes engaged with the second worm gear portion 131b, in this situation, the worm wheel 120 and the steering shaft 110 cannot rotate any more, and thereby, it is possible to prevent the steering wheel from being turned over the maximum rotation angle.

The gear teeth of the first worm gear portion 131a and the gear teeth of the second worm gear portion 131b may have different shapes (e.g., leads, pressure angles, pitch diameters, etc.), and the worm wheel 120 can rotate in a situation where the gear 121 engages the first worm gear portion 131a, and cannot rotate in a situation where the gear 121 engages the second worm gear portion 131b.

The shapes of the gear teeth of the first worm gear portion 131a and the second worm gear portion 131b can be designed using a self-locking condition of the gear, which will be described below in more detail.

As described above, in the conventional steering system, the turning of the steering wheel by a driver over the maximum rotation angle has been prevented by enabling torque resulting from the rotation of the worm shaft by a motor to be transferred to the worm wheel and the steering shaft, and to do this, the motor capable of generating a high torque has been required to offset steering torque provided by the driver. Thus, this can lead to disadvantages in terms of cost, weight, package, and the like, In contrast, in the steer-by-wire type of steering apparatus according to aspects of the present disclosure, as the gear 121 becomes engaged with the second worm gear portion 131b at the maximum rotation angle of the steering wheel, and thereby the worm wheel 120 is placed in a non-rotatable state, it is possible to effectively prevent the steering wheel from being turned over the maximum rotation angle even without boosting the size and weight etc. of the motor, and provide advantages in terms of cost, package, and the like.

Figure 2:
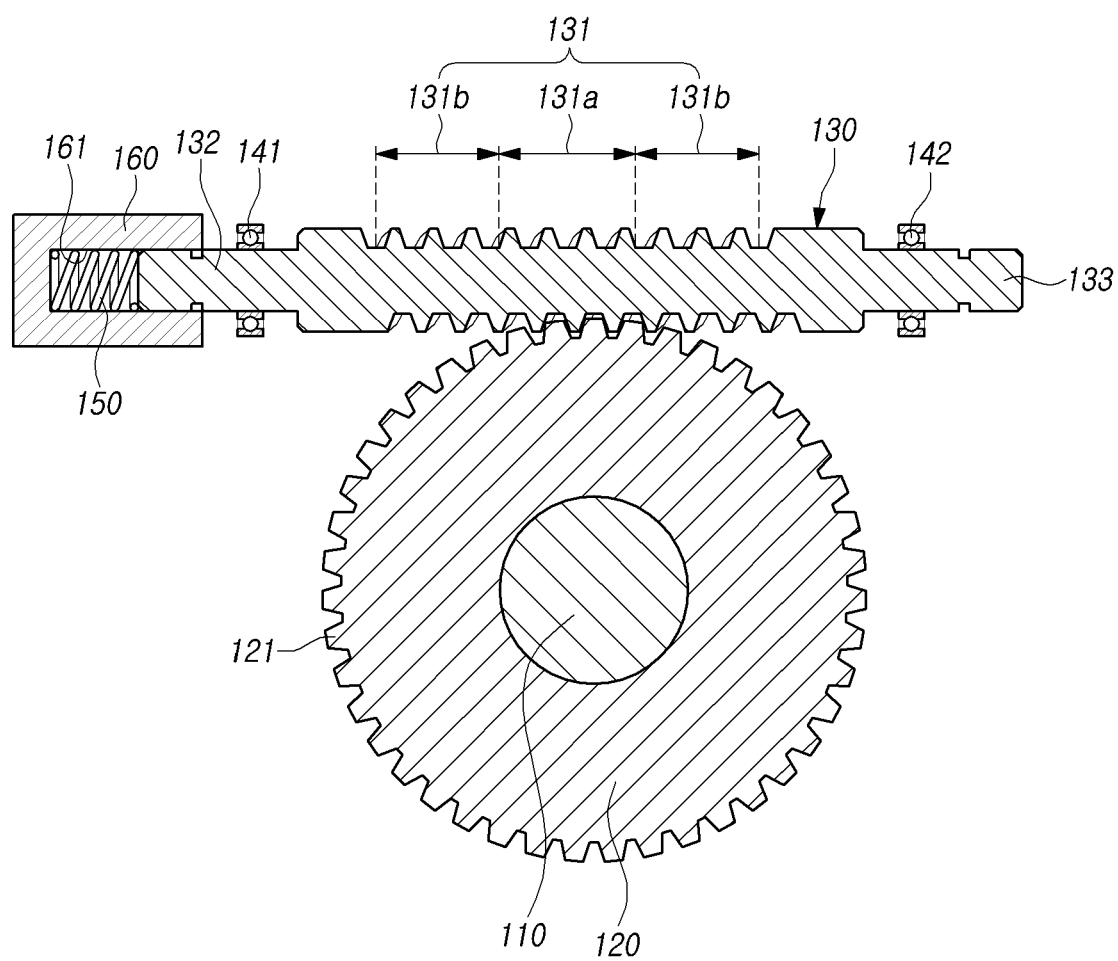
FIG. 2 is a cross-sectional view of a structure in which components of FIG. 1 are combined.

Referring to FIG. 2, the first worm gear portion 131a may be disposed at a central portion of the worm gear 131, and the second worm gear portion 131b may be disposed on both sides of the first worm gear portion 131a.

Figure 3:
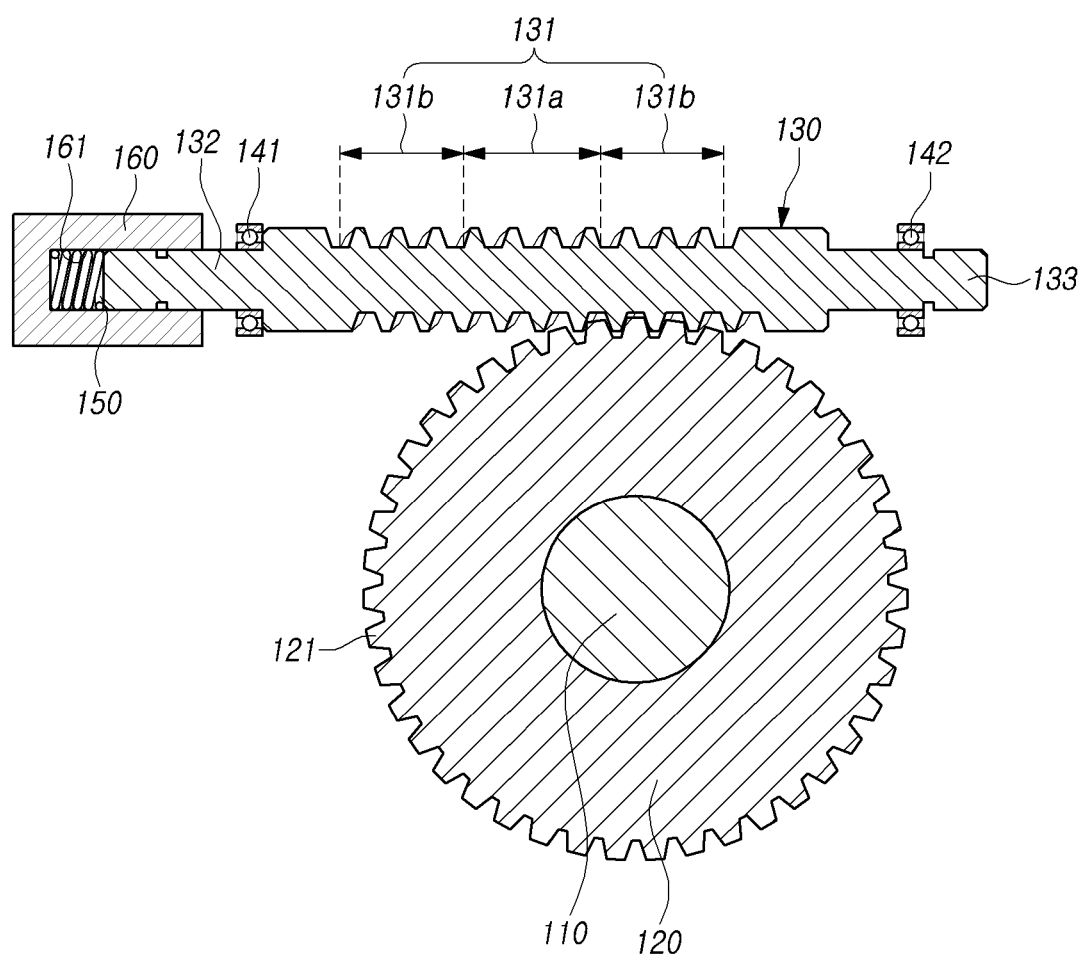
FIGS. 3 and 4 illustrate operating statuses in the structure of FIG.
Figure 4:
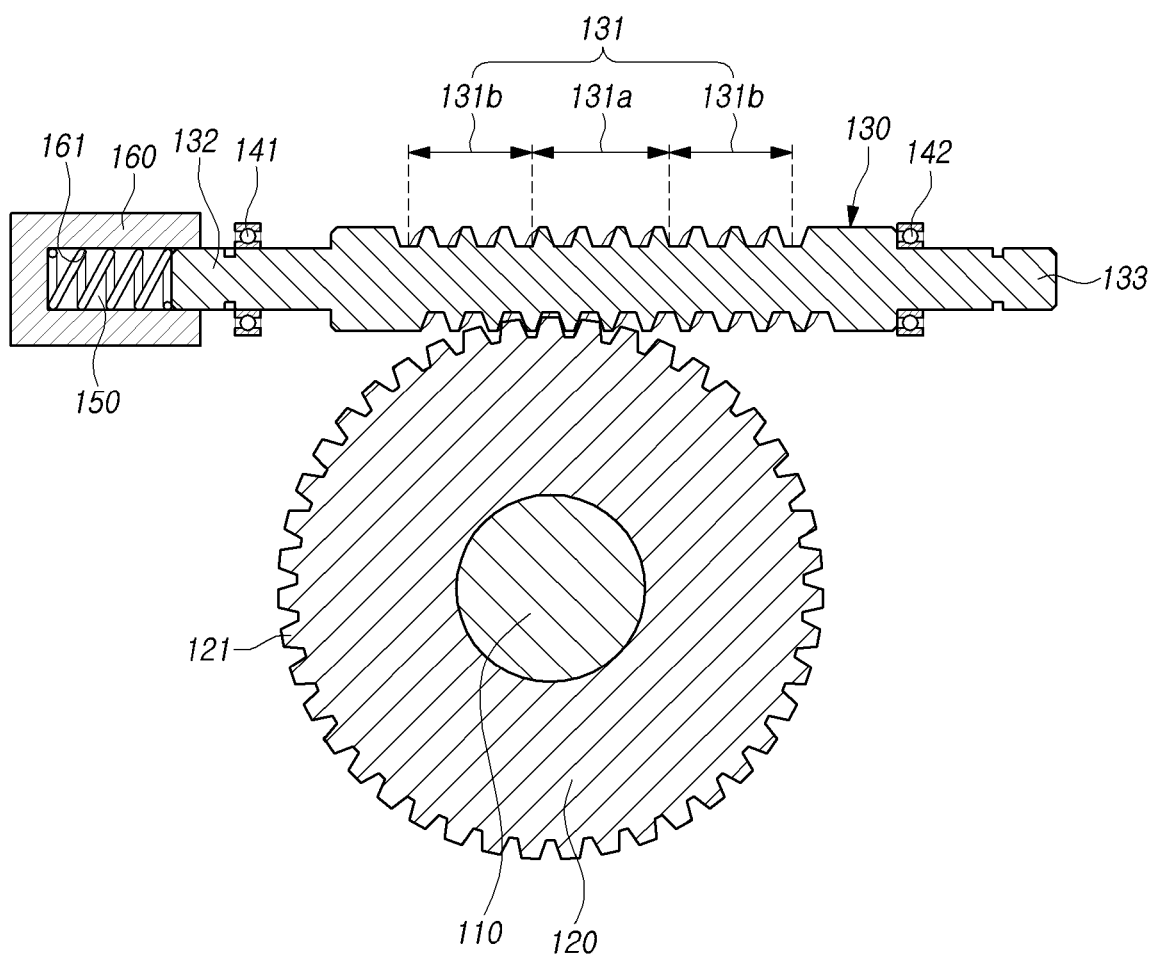
Figure 5:
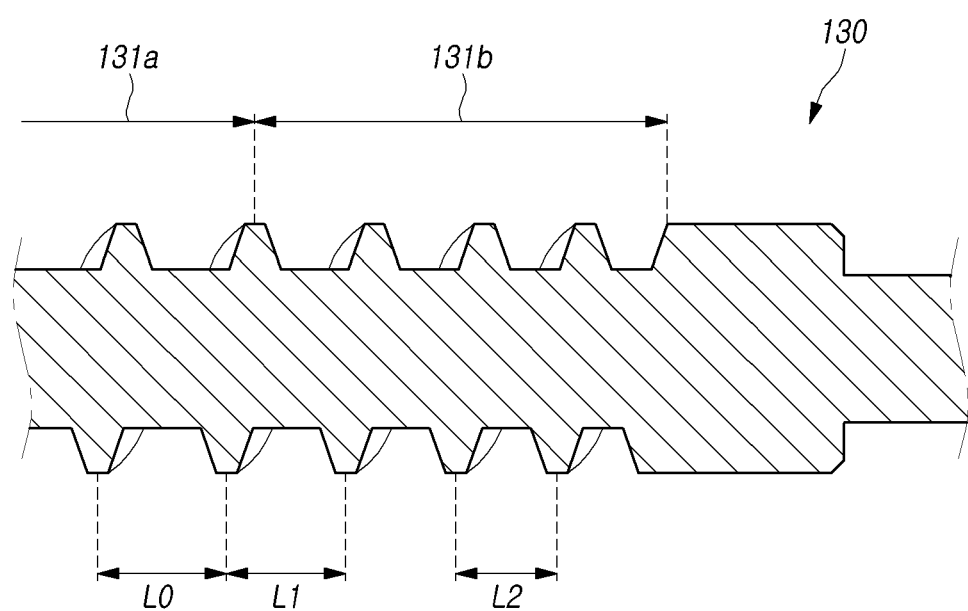
FIGS. 5 to 7 are cross-sectional views of a portion of the steer-by-wire type of steering apparatus according to aspects of the present disclosure.
Figure 6:
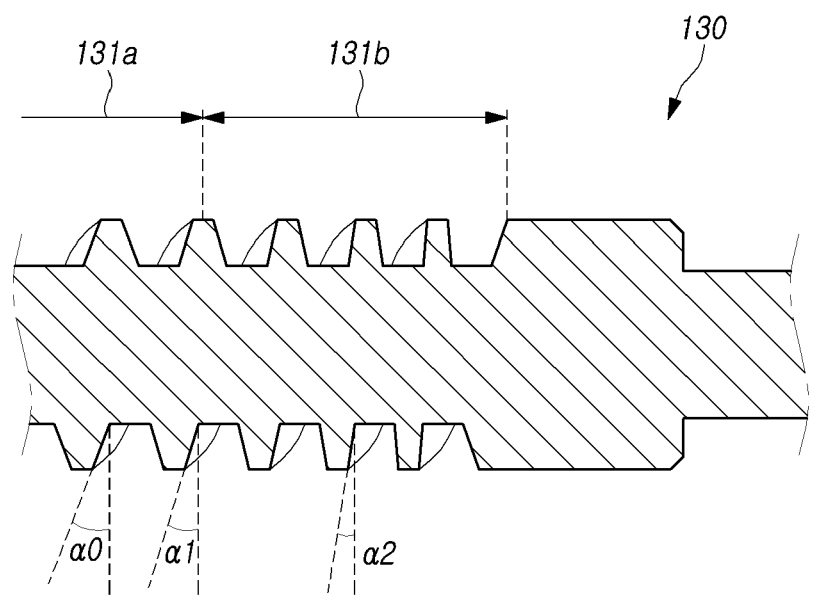
Figure 7:
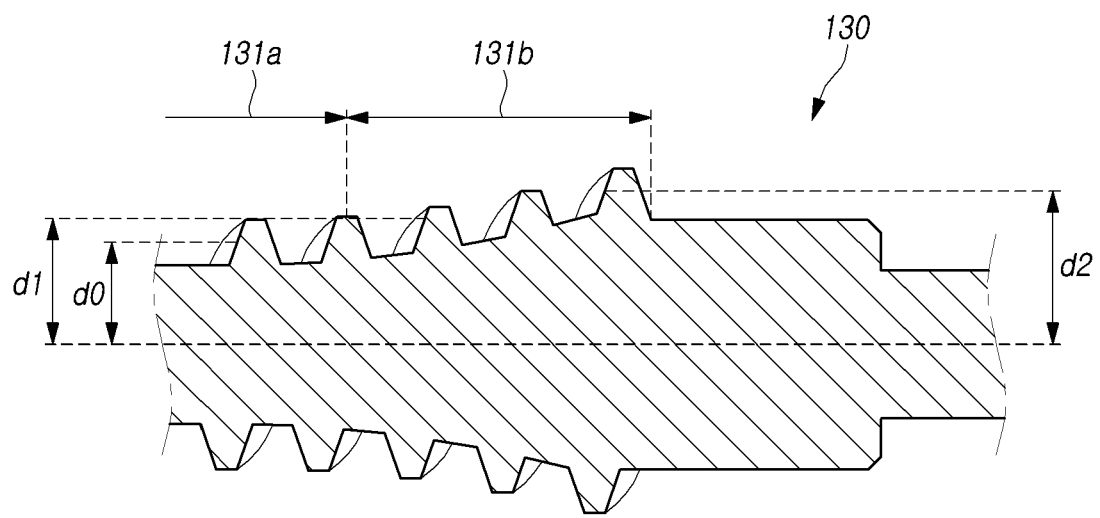

Although FIGS. 2 to 4 show that the first worm gear portion 131a and the second worm gear portion 131b have the same shape, these are merely for convenience of illustration. For example, as shown in FIGS. 5 to 7, it should be noted that the first worm gear portion 131a and the second worm gear portion 131b may be formed differently in at least one of a lead, a pressure angle, and a pitch diameter.

The first worm gear portion 131a and the second worm gear portion 131b may be formed symmetrically about the center of the worm gear 131. That is, the center of the first worm gear portion 131a may be aligned with the center of the worm gear 131, and the second worm gear portion 131b may be formed to have an equal length from both sides of the first worm gear portion 131a.

FIG. 2 shows a situation in which the center of the worm gear 131 is engaged with the gear 121 (hereinafter, referred to as "neutral status" for convenience), that is, the steering wheel is not rotated. FIGS. 3 to 4 show situations in which as the worm shaft 130 slides, the second worm gear portion 131b is engaged with the gear 121.

That is, when the steering wheel reaches a predetermined rotation angle, for example, the maximum rotation angle, as a driver turns the steering wheel in the clockwise or counterclockwise direction, the gear 121 becomes engaged with the second worm gear portion 131b that is located on the right side in figures or the second worm gear portion 131b that is located on the left side in figures, by the sliding of the worm shaft 130. Thereby, the turning of the steering wheel over the left or right maximum rotation angle can be effectively prevented.

In addition, bearings 141 and 142 for supporting the rotation of the worm shaft 130 may be disposed on the worm shaft 130, and the bearings 141 and 142 may be disposed to be axially spaced apart from the worm gear 131.

As described above, the worm shaft 130 may include shaft portions 132 and 133 disposed on both sides of the worm gear 131, and the bearings 141 and 142 may be disposed to be spaced apart from the worm gear 131 while being disposed on the shaft portions 132 and 133.

Although not shown in figures, the bearings 141 and 142 may be fixed in the axial direction inside of a housing (not shown) to support the rotation of the worm shaft 130, and the shaft portions 132 and 133 may be disposed to be axially slidable in inner races of the bearings 141 and 142.

As the bearings 141 and 142 are disposed on the shaft portions 132 and 133 and disposed to be axially spaced apart from the worm gear 131, the worm shaft 130 can axially slide by distances between the bearings 141 and 142 and ends of the worm gear 131.

In addition, as described above, in order for the worm shaft 130 to be connected with the support member 160, the support member 160 may have a seating hole 161 that is axially opened, and the shaft portion 132 may be inserted in the seating hole 161.

Further, an elastic member 150 may be disposed in the seating hole 161. The elastic member 150 can provide an elastic force when the worm shaft 130 axially slides toward one side or the other side thereof from the neutral status, and enable the worm shaft 130 to easily return to the neutral status.

That is, both ends of the elastic member 150 in the axial direction may be fixed to the worm shaft 130 and the support member 160 to provide the elastic force to the worm shaft 130 when compressed or stretched. For example, the ends of the elastic member 150 may be fixed to the worm shaft 130 and the support member 160 by welding or press fitting.

As shown in FIG. 3, when the worm shaft 130 slides leftward in the figure, the elastic member 150 is compressed to provide an elastic force rightward, and as shown in FIG. 4, when the worm shaft 130 slides rightward in the figures, the elastic member 150 is stretched to provide an elastic force leftward, so that the worm shaft 130 can be easily returned to its neutral status.

Since both ends of the elastic member 150 are fixed to the worm shaft 130 and the support member 160, respectively, it is desirable for the support member 160 to rotate along with the worm shaft 130 so that the elastic member 150 can successfully provide the elastic force even when the worm shaft 130 rotates.

Accordingly, a first serration 134 may be formed on an outer circumferential surface of the shaft portion 132 of the worm shaft 130, and a second serration 162 coupled to the first serration 134 may be formed on an inner circumferential surface of the support member 160, as shown in FIG. 1.

As the first serration 134 and the second serration 162 engage each other, when the worm shaft 130 axially slides, the shaft portion 132 can axially slide in the seating hole 161, and when the worm shaft 130 is rotated by the motor, the support member 160 can be rotated together.

Although not shown in figures, a bush or bearing may be further disposed in the housing to support the rotation of the support member 160.

Meanwhile, as described above, the worm gear 131 has a structure of including the first worm gear portion 131a rotatable in a situation of engaging the gear 121, and the second worm gear portion 131b not rotatable in a situation of engaging the gear 121. Such a structure of the worm gear 131 can be designed considering the self-locking condition of the gear.

A friction coefficient, a lead angle, and a pressure angle are considered for the self-locking condition of the gear. If the self-locking condition is satisfied, the gear cannot rotate even when an external force is applied, and if the self-locking condition is not satisfied, the gear can rotate freely.

The self-locking condition of the gear is expressed by Equation 1 as follows.

$$\mu \geq \tan \lambda \cos \alpha \qquad \text{[Equation 1]}$$

Here, µ denotes the friction coefficient between gear teeth, λ denotes the lead angle, and α denotes the pressure angle.

The lead angle and the pressure angle denotes the lead angle and the pressure angle of the worm gear 131. In the case of the worm gear, the lead angle can be expressed by Equation 2 as follows.

$$\tan \lambda = \frac{L}{\pi d} \quad \text{[Equation 2]}$$

Here, L denotes a lead, and d denotes a pitch diameter.

From Equations 1 and 2 above, the self-locking condition of the gear can be derived as Equation 3 as follows.

$$\mu \geq \frac{L \cos \alpha}{\pi d} \quad \text{[Equation 3]}$$

Referring to Equation 3, the self-locking condition of the gear may, or may not, be satisfied by changing the lead, pressure angle, or pitch diameter. That is, the worm gear 131 may have a structure in which the first worm gear portion 131a does not satisfy the self-locking condition, and the second worm gear portion 131b satisfies the self-locking condition, and in this structure, in a situation where the first worm gear portion 131a becomes engaged with the gear 121, the worm wheel 120 and the worm shaft 130 can rotate, and in a situation where the second worm gear portion 131b becomes engaged with the gear 121, the worm wheel 120 and the worm shaft 130 are not rotate.

That is, the second worm gear portion 131b may have a small lead, a small pressure angle, or a large pitch diameter compared with the first worm gear portion 131a, or may satisfy the self-locking condition by complying with two or more of these three conditions.

In some embodiments, referring to FIG. 5, the lead of the second worm gear portion 131b may be smaller than the lead of the first worm gear portion 131a.

Further, the lead of the second worm gear portion 131b may be formed to become gradually smaller toward an axial edge.

That is, a lead L2 of the second worm gear portion 131b at a location spaced apart from the first worm gear portion 131a may be smaller than a lead L1 thereof at a location close to the first worm gear portion 131a, and the leads L1 and L2 of the second worm gear portion 131b may be smaller than the leads L0 of the first worm gear 131.

As the second worm gear portion 131b is formed to become gradually smaller toward an axial edge, when the gear 121 starts to engage the second worm gear portion 131b, the steering feel of a driver gradually becomes heavy, and in this situation, when the driver further turns the steer wheel, the gear 121 becomes engaged with the second worm gear portion 131b, thereby preventing the driver from operating the steering wheel.

In some embodiments, referring to FIG. 6, the pressure angle of the second worm gear portion 131b may be smaller than the pressure angle of the first worm gear portion 131a.

Further, the pressure angle of the second worm gear portion 131b may be formed to become gradually smaller toward the axial edge.

That is, a pressure angle α2 of the second worm gear portion 131b at a location spaced apart from the first worm gear portion 131a may be smaller than a pressure angle α1 thereof at a location close to the first worm gear portion 131a, and the pressure angles α1 and α2 of the second worm gear portion 131b may be smaller than the pressure angle α0 of the first worm gear 131.

Likewise, as the pressure angle of the second worm gear portion 131b is formed to become gradually smaller toward the axial edge, when the gear 121 starts to engage the second worm gear portion 131b, the steering feel of a driver gradually becomes heavy, and in this situation, when the driver further turns the steer wheel, the gear 121 becomes engaged with the second worm gear portion 131b, thereby preventing the driver from operating the steering wheel.

In some embodiments, referring to FIG. 7, the pitch diameter of the second worm gear portion 131b may be greater than the pitch diameter of the first worm gear portion 131a.

Further, the pitch diameter of the second worm gear portion 131b may be formed to become gradually greater toward the axial edge.

That is, a pitch diameter d2 of the second worm gear portion 131b at a location spaced apart from the first worm gear portion 131a may be greater than a pitch diameter d1 thereof at a location close to the first worm gear portion 131a, and the pitch diameters d1 and d2 of the second worm gear portion 131b may be greater than the pitch diameter d0 of the first worm gear 131.

Likewise, as the pitch diameter of the second worm gear portion 131b is formed to become gradually greater toward the axial edge, when the gear 121 starts to engage the second worm gear portion 131b, the steering feel of a driver gradually becomes heavy, and in this situation, when the driver further turns the steer wheel, the gear 121 becomes engaged with the second worm gear portion 131b, thereby preventing the driver from operating the steering wheel.

Table 1 below shows a comparison of leads, pressure angles, and pitch diameters of the first worm gear portion 131a and the second worm gear portion 131b.

As shown in Table 1, in a situation where the second worm gear portion 131b is formed to have a lead and/or a pressure angle smaller than the first worm gear portion 131a, and/or a pitch diameter greater than the first worm gear portion 131a, as the first worm gear portion 131a does not satisfy the self-locking condition, the first worm gear portion 131a can engage the gear 121 and freely rotate, and as the second worm gear portion 131b satisfies the self-locking condition, the second worm gear portion 131b cannot engage the gear 121 and rotate. Hereinafter, a steer-by-wire type of steering apparatus 800 according to aspects of the present disclosure will be described with reference to FIGS. 8 to 13. The steering apparatus of FIGS. 8 to 13 may have components equal, or substantially equal, to some components of the steering apparatus described with reference to FIGS. 1 to 7. Such components may be labeled with like reference numbers, the details of which may be replaced by the discussions conducted above.

The steer-by-wire steering device 800 according to aspects of the present disclosure includes a worm shaft 830 including a worm gear 831, and a worm wheel 820 that is coupled to a steering shaft 810 and includes a gear 821 including a first gear portion 821a rotatable in a situation of engaging the worm gear 831 and a second gear portion 821b not rotatable in a situation of engaging the worm gear 831.

In a structure where the gear 821 of the worm wheel 820 includes the first gear portion 821a and the second gear portion 821b, before the steering wheel reaches a predetermined rotation angle, for example, a maximum rotation angle, the worm gear 831 engages the first gear portion 821a. As the worm wheel 820 further rotates due to an increased rotation angle of the steering wheel by the turning of a driver, when the steering wheel reaches the maximum rotation angle, the worm gear 831 becomes engaged with the second gear portion 821*b*, and the worm wheel 820 and the steering shaft 810 cannot rotate any more. Thereby, it is possible to prevent the steering wheel from being turned over the maximum rotation angle.

That is, the first gear portion 821*a* can engage the worm gear 831 in a structure of not satisfying the self-locking condition, and the second gear portion 821*b* can engage the worm gear 831 in a structure of satisfying the self-locking condition.

Further, an area where the first gear portion 821*a* is formed may have a wider central angle than an area where the second gear portion 821*b* is formed.

Figure 8:
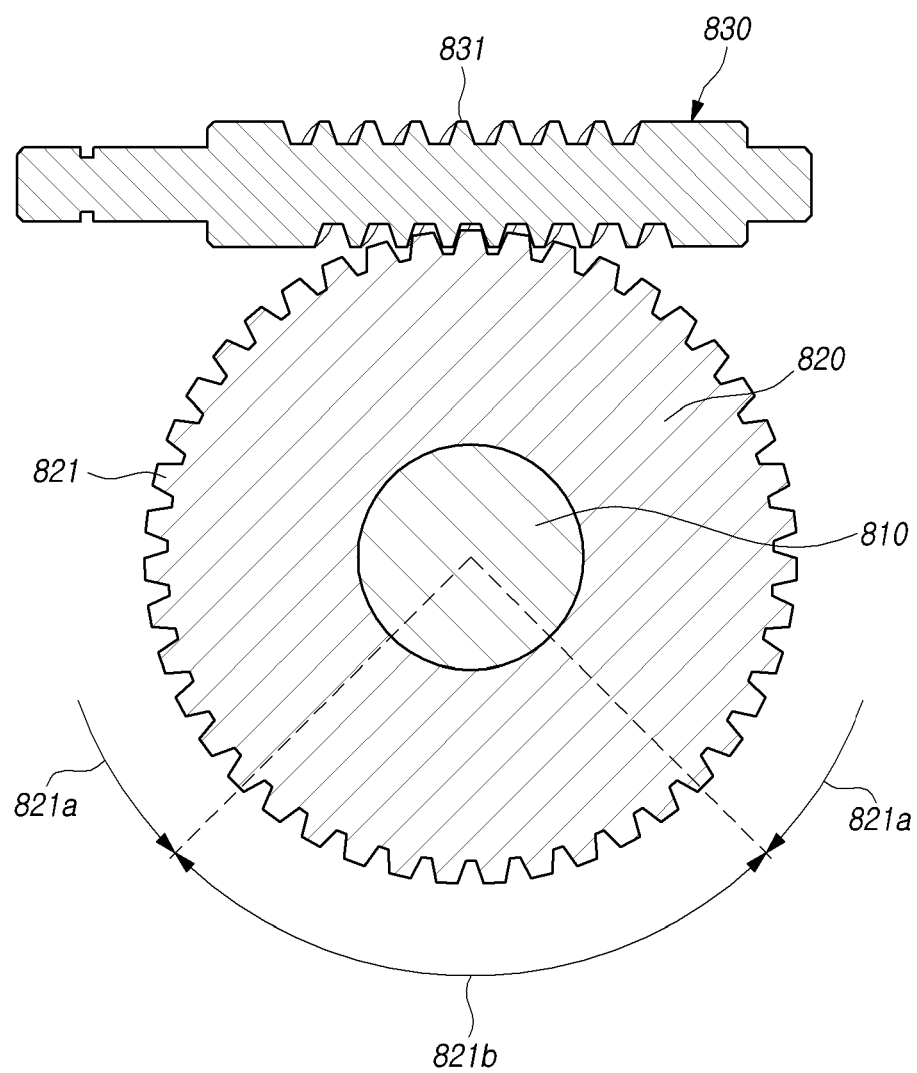
FIG. 8 is a cross-sectional view of a portion of a steer-by-wire type of steering apparatus according to aspects of the present disclosure.
Figure 9:
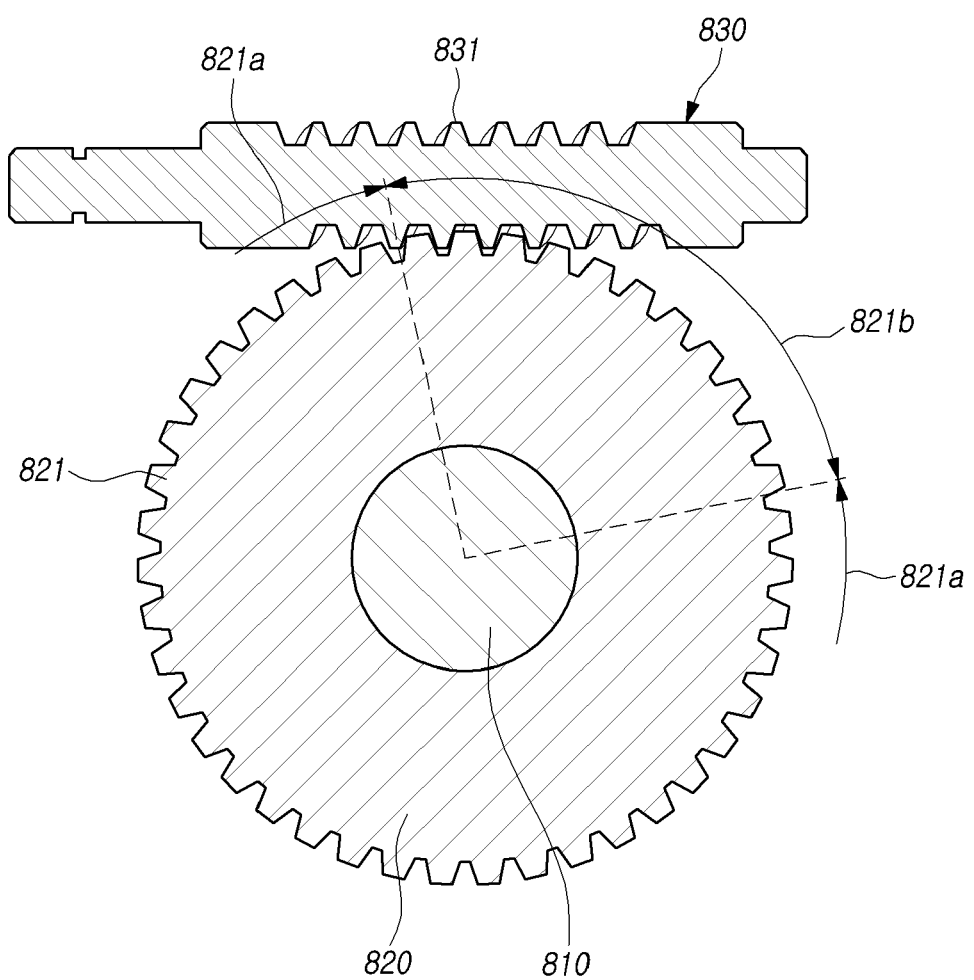
FIGS. 9 and 10 illustrate operating statuses in the apparatus of FIG.
Figure 10:
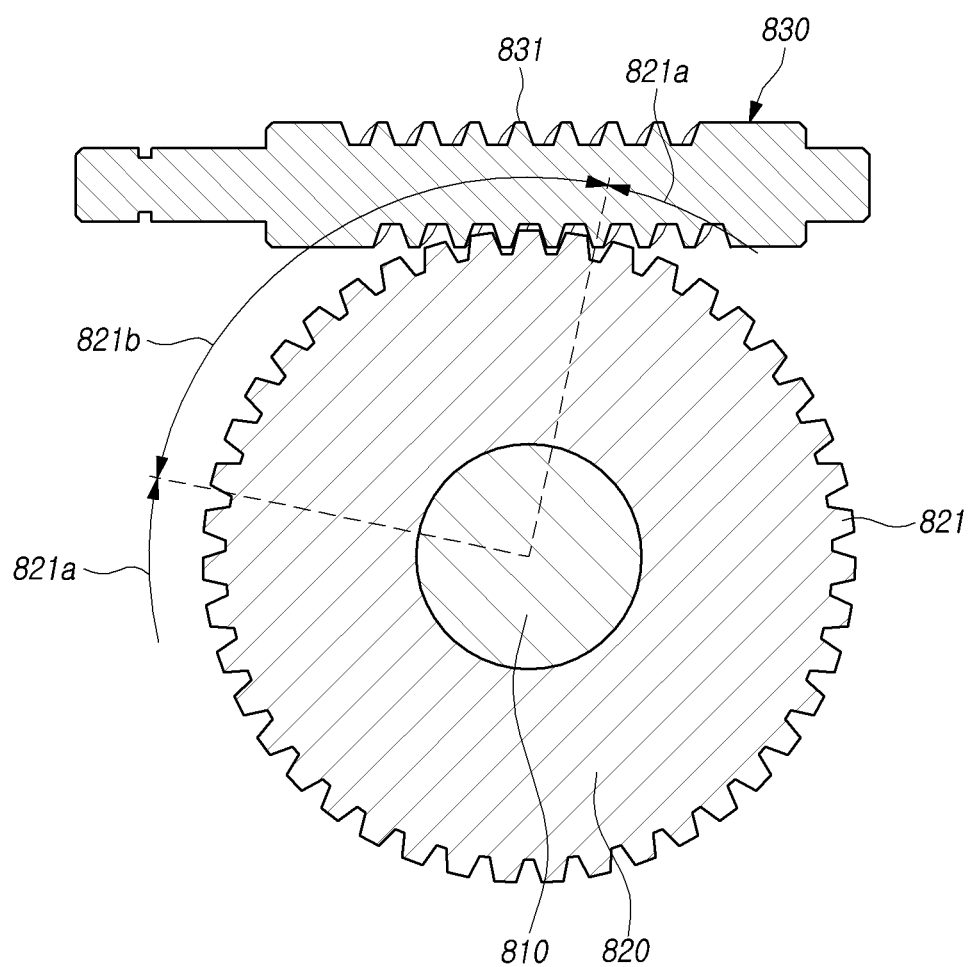

FIG. 8 shows a neutral status in which the center of the first gear portion 821*a* engages the worm gear 831, and FIGS. 9 and 10 show states where the second gear portion 821*b* is engaged with the worm gear 831 by the rotation of the worm wheel 820.

In the neutral status, since the worm gear 831 engages the center of the first gear portion 821*a*, the second gear portion 821*b* is placed at a location opposite to the worm shaft 830.

Figures show an embodiment in which the first gear portion 821*a* has a central angle of about 270 degrees and the second gear portion 821*b* has a central angle of about 90 degrees.

In general, the steering wheel has a maximum rotation angle of about 540 degrees in the clockwise or counterclockwise direction, and the worm wheel 820 is connected to the steering wheel through the steering shaft 810 and can rotate by the same angle as the steering wheel. In order for the worm gear 831 to engages the first gear port ion 821*a* within the maximum rotation angle of the steering wheel, the rotation angle of the worm wheel 820 is needed to be reduced.

That is, in a situation where the maximum rotation angle of the steering wheel is 180 degrees or more, the second gear portion 821*b* becomes engaged with the worm gear 831 and the worm wheel 820 cannot rotate before the steering wheel reaches the maximum rotation angle. Therefore, the maximum rotation angle of the worm wheel 820 is needed to be limited.

In one embodiment, in a situation where the first gear portion 821*a* has a central angle of about 270 degrees, the steering wheel may have a maximum rotation angle of about 135 degrees in the clockwise or counterclockwise direction. In this case, even though the maximum rotation angle of the steering wheel is limited, a steering angle of wheels can be obtained by employing a separate gear structure, and a detailed description on such a structure is omitted.

Meanwhile, in another embodiment, by providing a gear structure between the worm wheel 820 and the steering wheel, while maintaining the maximum rotation angle of the steering wheel, the worm wheel 820 can be designed to have a smaller rotation angle than the rotation angle of the steering wheel, and thereby, it is possible to enable the second gear portion 821*b* to engage the worm gear 831 at the maximum rotation angle of the steering wheel without reducing the steering feel of drivers.

Next, the second gear portion 821*b* may have a lead angle, lead, and/or pressure angle smaller than the first gear portion 821*a*, or may satisfy the self-locking condition by complying with two or more of these three conditions.

Figure 11:
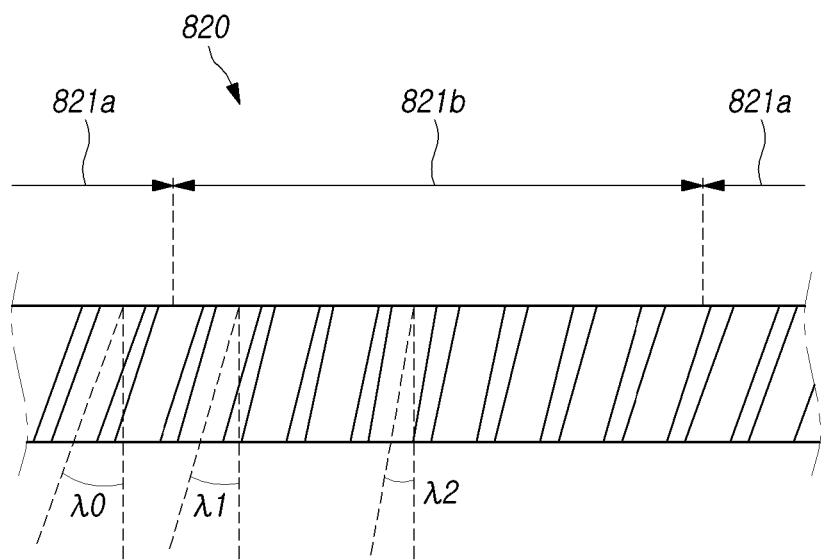
FIG. 11 is a side view of a portion of the steer-by-wire type of steering apparatus according to aspects of the present disclosure.

In some embodiments, referring to FIG. 11, the lead angle of the second gear port ion 821*b* may be smaller than the lead angle of the first gear port ion 821*a*.

Further, the lead angle of the second gear portion 821*b* may be formed to become gradually smaller toward a center of the second gear portion 821*b*.

That is, a lead angle ($\lambda 2$) of the second gear port ion 821*b* at the center of the second gear port ion 821*b* may be smaller than a lead angle ($\lambda 1$) thereof at a location close to the first gear portion 821*a*, and the lead angles ($\lambda 1, \lambda 2$) of the second gear portion 821*b* may be smaller than the lead angle ($\lambda 0$) of the first gear portion 821*a*.

As the second gear portion 821*b* is formed to become gradually smaller toward the center of the second gear portion 821*b*, when the worm gear 831 starts to engage the second gear portion 821*b*, the steering feel of a driver gradually becomes heavy, and in this situation, when the driver further turns the steer wheel, the worm gear 831 becomes engaged with the second gear portion 821*b*, thereby preventing the driver from operating the steering wheel.

Figure 12:
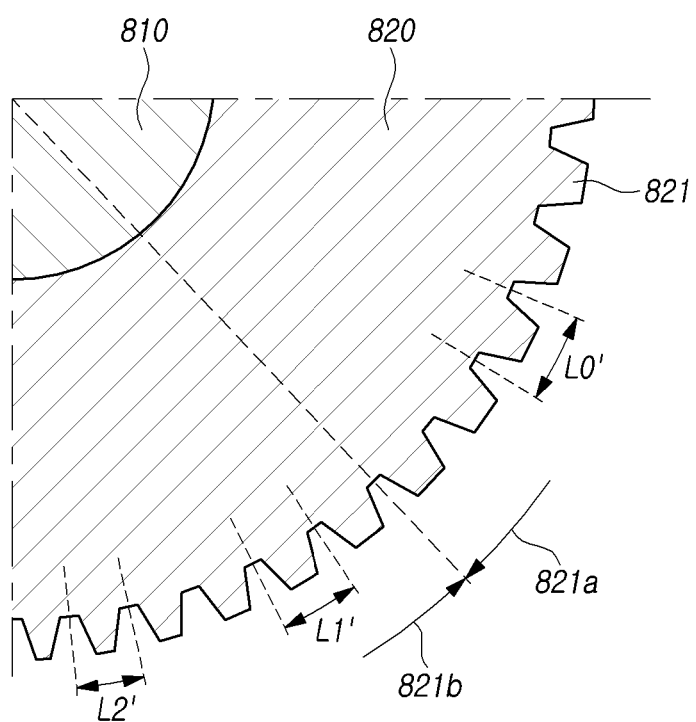
FIGS. 12 and 13 are cross-sectional views of a portion of the steer-by-wire type of steering apparatus according to aspects of the present disclosure.

In some embodiments, referring to FIG. 12, the lead of the second gear portion 821*b* may be smaller than the lead of the first gear portion 821*a*.

Further, the lead of the second gear portion 821*b* may be formed to become gradually smaller toward the center of the second gear portion 821*b*.

That is, a lead L2' of the second gear portion 821*b* at the center of the second gear portion 821*b* may be smaller than a lead L1' thereof at a location close to the first gear portion 821*a*, and the leads L1' and L2' of the second gear portion 821*b* may be smaller than the lead L0' of the first gear portion 821*a*.

Likewise, as the second gear portion 821*b* is formed to become gradually smaller toward the center of the second gear portion 821*b*, when the worm gear 831 starts to engage the second gear portion 821*b*, the steering feel of a driver gradually becomes heavy, and in this situation, when the driver further turns the steer wheel, the worm gear 831 becomes engaged with the second gear portion 821*b*, thereby preventing the driver from operating the steering wheel.

Figure 13:
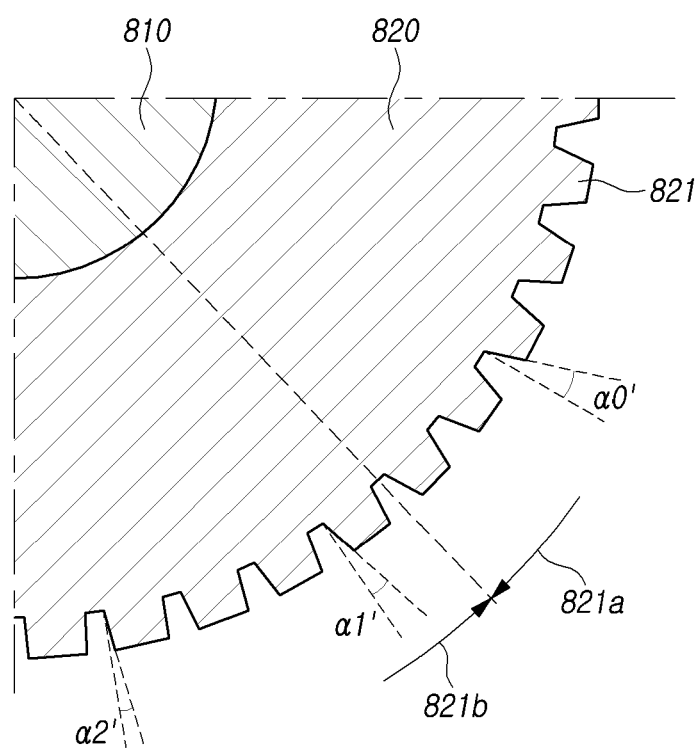

In some embodiments, referring to FIG. 13, the pressure angle of the second gear portion 821*b* may be smaller than the pressure angle of the first gear portion 821*a*.

Further, the pressure angle of the second gear portion 821*b* may be formed to become gradually smaller toward the center of the second gear portion 821*b*.

That is, a pressure angle ($\alpha 2'$) of the second gear portion 821*b* at the center of the second gear portion 821*b* may be smaller than a pressure angle ($\alpha 1'$) thereof at a location close to the first gear portion 821*a*, and the pressure angles ($\alpha 1', \alpha 2'$) of the second gear port ion 821*b* may be smaller than the pressure angle ($\alpha 0'$) of the first gear portion 821*a*.

Likewise, as the second gear portion 821*b* is formed to become gradually smaller toward the center of the second gear portion 821*b*, when the worm gear 831 starts to engage the second gear portion 821*b*, the steering feel of a driver gradually becomes heavy, and in this situation, when the driver further turns the steer wheel, the worm gear 831 becomes engaged with the second gear portion 821*b*, thereby preventing the driver from operating the steering wheel.

Further, in a situation where the second gear portion 821*b* is formed to have a lead angle, lead, and/or pressure angle smaller than the first gear portion 821*a*, as the first gear portion 821*a* does not satisfy the self-locking condition, the first worm gear portion 821*a* can engage the worm gear 831 and freely rotate, and as the second gear portion 821*b* satisfies the self-locking condition, the second gear portion 821*b* cannot engage the worm gear 831 and rotate.

Further, as not shown in figures, embodiments of the present disclosure may have not only a structure in which the gear 821 of the worm wheel 820 includes the first gear portion 821*a* and the second gear portion 821*b*, but also a structure in which the worm gear 831 of the worm shaft 831 includes a first worm gear portion rotatable in a situation of engaging the gear 821 and a second worm gear portion not rotatable in a situation of engaging the gear 821, as shown in FIGS. 1 to 7.

In such a case, the worm shaft 830 may further include a bearing, an elastic member, a support member, and the like coupled to, and spaced apart from, the worm gear 831 so that the worm shaft 830 can axially slide.

In the steer-by-wire type of steering apparatus having the structures described above, it is possible to effectively limit the turning of the steering wheel within a predetermined rotation angle even without boosting the size and weight etc. of a motor that generates torque to be transferred to the steering shaft by preventing the steering shaft from being rotated mechanically by a gear structure in a situation where the steering wheel is turned over the predetermined rotation angle, and provide advantages in terms of cost, package, and the like.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protect ion of the present disclosure should be construed based on the following claims, and all technical ideas within the scope of equivalents thereof should be construed as being included within the scope of the present disclosure.

What is claimed is:

1. A steer-by-wire steering apparatus comprising:
a worm wheel coupled to a steering shaft and including a gear; and
a worm shaft that is axially slidable and includes a worm gear including a first worm gear portion rotatable in a situation of engaging the gear and a second worm gear portion not rotatable in a situation of engaging the gear.

2. The steer-by-wire steering apparatus according to claim 1, wherein the first worm gear portion is disposed at a central portion of the worm gear, and the second worm gear portion is disposed on both sides of the first worm gear portion.

3. The steer-by-wire steering apparatus according to claim 1, wherein at least one bearing for supporting rotation of the worm shaft is coupled to the worm shaft, and the at least one bearing is disposed to be axially spaced apart from the worm gear.

4. The steer-by-wire steering apparatus according to claim 1, wherein an edge of the worm shaft is inserted in a support member having a seating hole that is axially opened, and an elastic member supported by the support member and elastically supporting the worm shaft is disposed in the seating hole.

5. The steer-by-wire steering apparatus according to claim 4, wherein a first serration is formed on an outer circumferential surface of the edge of the worm shaft, and a second serration coupled to the first serration is formed on an inner circumferential surface of the support member.

6. The steer-by-wire steering apparatus according to claim 1, wherein a lead of the second worm gear portion is smaller than a lead of the first worm gear portion.

7. The steer-by-wire steering apparatus according to claim 6, wherein the lead of the second worm gear portion gradually becomes smaller toward an axial edge.

8. The steer-by-wire steering apparatus according to claim 1, wherein a pressure angle of the second worm gear portion is smaller than a pressure angle of the first worm gear portion.

9. The steer-by-wire steering apparatus according to claim 8, wherein the pressure angle of the second worm gear portion gradually becomes smaller toward an axial edge.

10. The steer-by-wire steering apparatus according to claim 1, wherein a pitch diameter of the second worm gear portion is greater than a pitch diameter of the first worm gear portion.

11. The steer-by-wire steering apparatus according to claim 10, wherein the pitch diameter of the second worm gear portion gradually becomes greater toward an axial edge.

12. A steer-by-wire steering apparatus comprising:
a worm shaft including a worm gear; and
a worm wheel coupled to a steering wheel, and including
a gear including a first gear portion rotatable in a situation of engaging the worm gear and a second gear portion not rotatable in a situation of engaging the worm gear.

13. The steer-by-wire steering apparatus according to claim 12, wherein an area where the first gear portion is formed has a wider central angle than an area where the second gear portion is formed.

14. The steer-by-wire steering apparatus according to claim 12, wherein a lead angle of the second gear portion is smaller than a lead angle of the first gear portion.

15. The steer-by-wire steering apparatus according to claim 14, wherein the lead angle of the second gear portion gradually becomes smaller toward a center of the second gear portion.

16. The steer-by-wire steering apparatus according to claim 12, wherein a lead of the second gear portion is smaller than a lead of the first gear portion.

17. The steer-by-wire steering apparatus according to claim 16, wherein the lead of the second gear portion gradually becomes smaller toward a center of the second gear portion.

18. The steer-by-wire steering apparatus according to claim 12, wherein a pressure angle of the second gear portion is smaller than a pressure angle of the first gear portion.

19. The steer-by-wire steering apparatus according to claim 18, wherein the pressure angle of the second gear portion gradually becomes smaller toward a center of the second gear portion.

* * * * *